United States Patent [19]
Becker

[11] Patent Number: 5,957,394
[45] Date of Patent: Sep. 28, 1999

[54] BEDDING MATERIAL SPREADER DEVICE

[76] Inventor: Harry H. Becker, 399 A S. Reading Rd., Ephrata, Pa. 17522

[21] Appl. No.: 08/991,774

[22] Filed: Dec. 16, 1997

[51] Int. Cl.⁶ .............................. A01C 19/00; B05B 1/28
[52] U.S. Cl. ...................... 239/673; 239/288.3; 239/675; 239/682; 239/689
[58] Field of Search ................................ 239/288, 288.3, 239/671, 672, 673, 674, 675, 677, 680, 682, 689

[56] References Cited

U.S. PATENT DOCUMENTS

| | | |
|---|---|---|
| D. 240,152 | 6/1976 | Raffler et al. . |
| D. 338,893 | 8/1993 | Simpson . |
| D. 388,440 | 12/1997 | Bentley . |
| 2,755,092 | 7/1956 | Donahoe . |
| 3,015,416 | 1/1962 | Peoples et al. . |
| 3,019,025 | 1/1962 | Young . |
| 3,167,319 | 1/1965 | Kerr . |
| 4,261,520 | 4/1981 | Hetrick . |
| 4,326,673 | 4/1982 | Thene .................................... 239/675 |
| 4,720,047 | 1/1988 | Knight et al. . |
| 5,180,112 | 1/1993 | Hoyle . |
| 5,435,494 | 7/1995 | Knight et al. ........................... 239/675 |
| 5,493,852 | 2/1996 | Stewart . |
| 5,501,403 | 3/1996 | Van Vooren . |

FOREIGN PATENT DOCUMENTS

| | | | |
|---|---|---|---|
| 0158355 | 11/1978 | Germany | ................................ 239/675 |
| 0385236 | 9/1990 | Germany | ................................ 239/673 |

OTHER PUBLICATIONS

Rubber Round Up, Mensch Mfg., Hasting, MI 49058, Dec. 1998.
Skid Feeder 40, Harvetn Tee, Hudson WI 54016, Dec. 1998.
Saw Dust Blower 1500 Series, Ty–Corp Manufacturing Ltd, Chilliwack, British Columbia, Canada V2P 6H4, Dec. 1998.

*Primary Examiner*—Andres Kashnikow
*Assistant Examiner*—Jorge Bocanegra
*Attorney, Agent, or Firm*—Dinesh Agarwal, P.C.

[57] ABSTRACT

A bedding material spreader device of the present invention includes a hopper for holding a material. The hopper is open at the top and includes a closed bottom. A screw-auger is rotatably positioned along the inside bottom of the hopper for conveying the material towards the left or the right discharge opening provided on the rear wall of the hopper. Left and right spinners for spreading the material, either from the left or right side of the hopper, are provided in corresponding recesses on the exterior rear wall of the hopper. The auger includes radially extending blades on the left and right ends thereof, which spin-out the material from inside the hopper towards the left or right discharge opening and into the corresponding spinner which feeds-out the material out of the hopper. A hydraulic mechanism, which selectively runs the hydraulic flow in opposite directions, allows either the left or the right spinner to rotate to thereby allow the material to be fed-out from either side of the device.

12 Claims, 4 Drawing Sheets

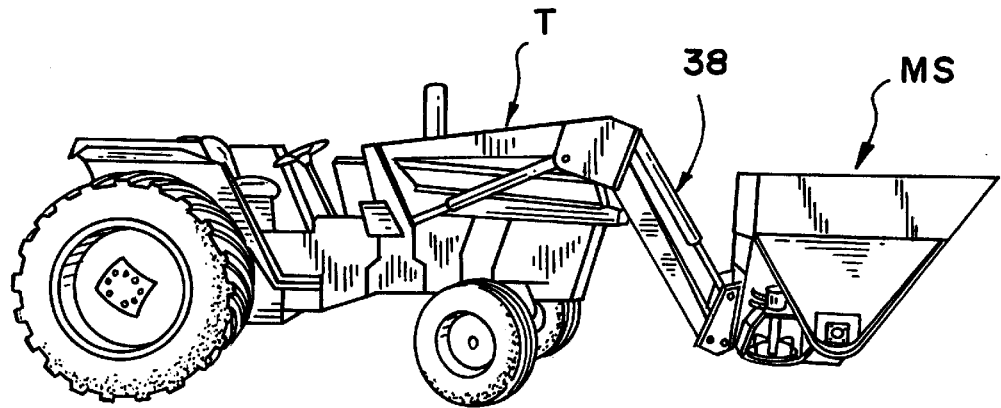
FIG_1
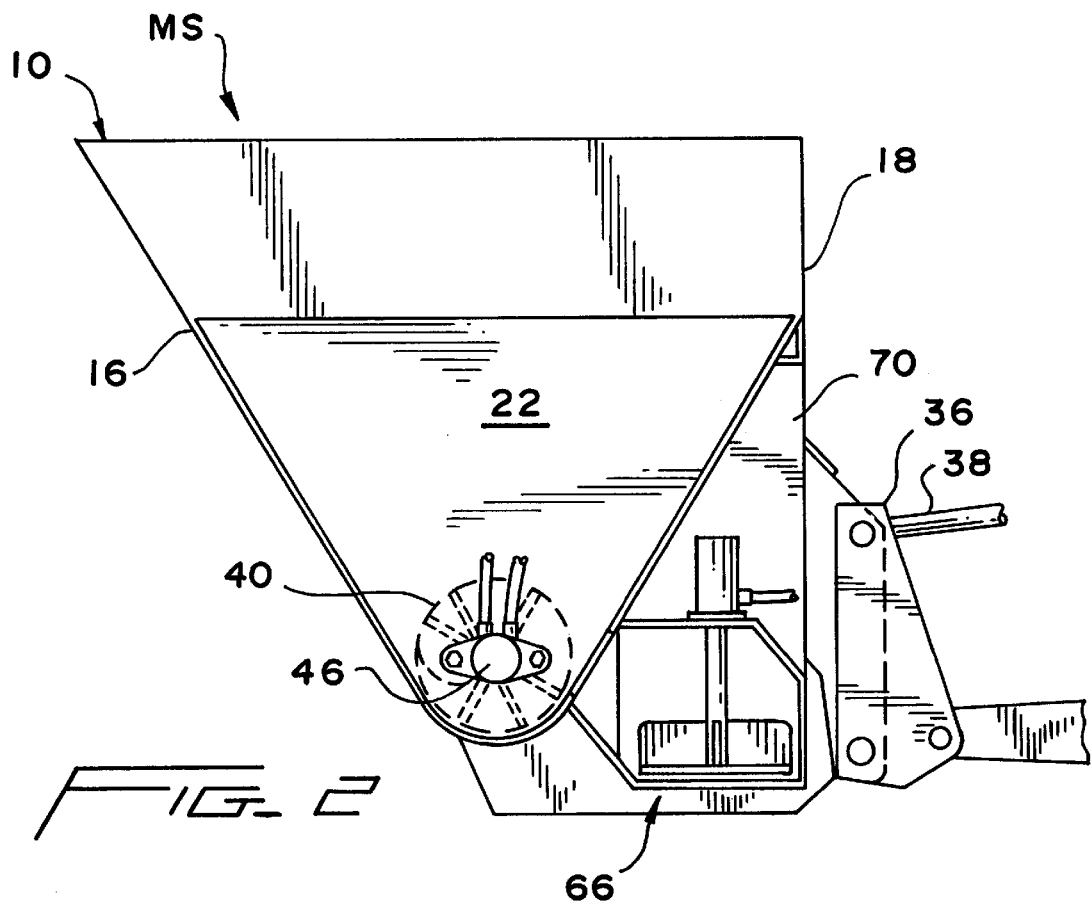
FIG_2

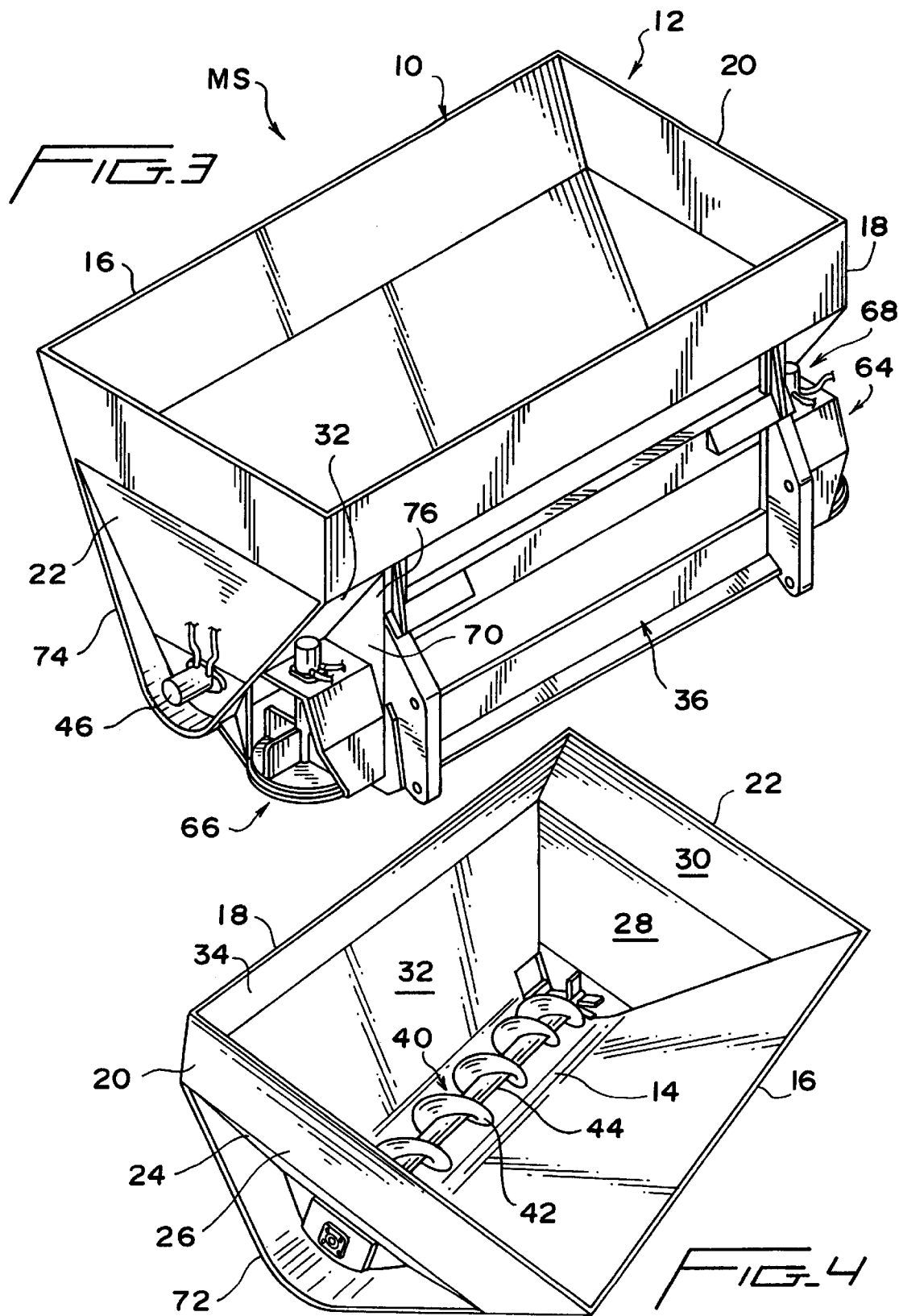

BEDDING MATERIAL SPREADER DEVICE

FIELD AND HISTORICAL BACKGROUND OF THE INVENTION

The present invention is generally directed to devices for spreading various materials, and more particularly to a bedding material spreader device which may be used to spread sawdust or the like material in a freestall for cows.

In a dairy farm, it is common to spread sawdust or the like material into the stalls to keep them clean and bedded. This is commonly done by using a tractor with a front loader to scoop the sawdust and spread it into the stalls by using a grain shovel or the like. This practice is labor intensive, time consuming and creates a lot of dust as the shoveling is done from the loader to the area of the stalls where the sawdust is poured and spread. While this practice may be economical for a very small farm, it is not practical for a dairy farm with multiple cows.

Various types of devices are currently available for spreading the sawdust or the like material. One such device includes a side-shooter which uses a rotating belt inside a bucket holding the material, and shoots-out the material from an opening on one side of the bucket. The side-shooter, however, has several disadvantages. First, as the belt rotates, it creates a lot of dust in the vicinity thereby making it difficult to perform the spreading operation. Second, the side-shooter shoots-out the material only from one side of the bucket thereby making it difficult to spread the stalls on both sides without turning the tractor around. Third, with the side-shooter it is difficult to put a thin and even layer of the material in the stalls.

Another conventional spreader includes an auger, instead of a belt mechanism, to shoot the material from a bucket or hopper. This type of spreader also has several disadvantages. First, the material can only be fed-out from one side of the bucket. Second, the motor for spinning the auger protrudes past one side of the bucket on one side, and the spinning mechanism to feed-out the material on the other side of the bucket. This configuration of the spreader makes it very difficult to maneuver the spreader around the stalls without catching or running into posts, freestalls, etc. Moreover, since the material can only be fed-out from one side of the bucket, it is impossible to get the material in all the corners.

Various other types of devices are shown in U.S. Pat. Nos.: 2,755,092; 3,019,025; 3,167,319; 4,261,520; and 4,720,047. There is, however, a need in the industry for a material spreading device that does not suffer from the disadvantages associated with the conventional devices and which can be easily used to spread the material from either side of a hopper.

OBJECTS AND SUMMARY OF THE INVENTION

The main object of the present invention is to provide a bedding material spreader device which overcomes the disadvantages associated with the conventional devices.

Another object of the present invention is to provide a bedding material spreader device which can be used to spread the material from either side of a bucket or hopper.

Yet another object of the present invention is to provide a bedding material spreader device which is compact and does not have any components extending past the sides of the hopper, thereby making it easier to maneuver around the farm, and specifically about the posts and freestall.

Still yet another object of the present invention is to provide a bedding material spreader device in which the spinners for spreading or shooting the material out from the hopper are positioned in a recess about the rear. This configuration protects the spinners and the associated components from being damaged during maneuvering of the spreader around a farm and further leads to a compact design.

An additional object of the present invention is to provide a bedding material spreader device in which the material does not flow out of the opening of the hopper as fast as the auger turns. Therefore, the auger pushes up and rolls the material in a circular motion within the bucket thereby keeping the material loose. This eliminates the need for a top agitator. This configuration further leads to significantly less dusty conditions that are present in a conventional design.

Yet an additional object of the present invention is to provide a bedding material spreader device which is simple in design and does not require many components.

Still yet an additional object of the present invention is to provide a bedding material spreader device in which a reversible hydraulic mechanism is used to selectively run either the left or the right spinner to feed-out the material from either side of the device.

In accordance with the above-noted objects, a bedding material spreader device of the present invention includes a hopper for holding a material. The hopper is open at the top and includes a closed bottom. A screw-auger is rotatably positioned along the inside bottom of the hopper for conveying the material towards the left or the right discharge opening provided on the rear wall of the hopper. Left and right spinners for spreading the material, either from the left or right side of the hopper, are provided in corresponding recesses on the exterior rear wall of the hopper. The auger includes radially extending blades on the left and right ends thereof, which spin-out the material from inside the hopper towards the left or right discharge opening and into the corresponding spinner which feeds-out the material out of the hopper. A hydraulic mechanism, which selectively runs the hydraulic flow in opposite directions, allows either the left or the right spinner to rotate to thereby allow the material to be fed-out from either side of the device.

BRIEF DESCRIPTION OF THE DRAWINGS

The above and other objects and novel features of the present invention will become apparent from a review of the detailed description of the preferred embodiment of the invention provided below, and as illustrated in the drawings, in which:

FIG. 1 is a left side elevational view of the bedding material spreader device of the present invention, shown attached to a tractor;

FIG. 2 is an enlarged right side elevational view of the spreader device shown in FIG. 1;

FIG. 3 is a right perspective view of the spreader device shown in FIG. 2;

FIG. 4 is a top perspective view of the spreader device shown in FIG. 3;

DETAILED DESCRIPTION OF THE PREFERRED EMBODIMENT OF THE INVENTION

Figure 5:
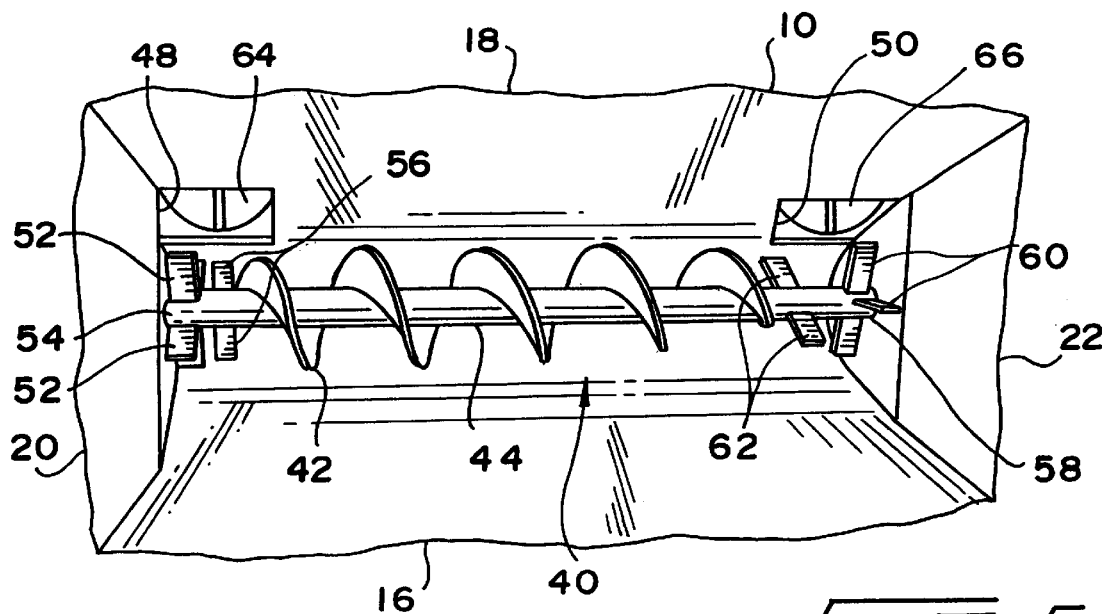
FIG. 5 is a partial top plan view of the spreader device shown in FIG. 4.

As best shown in FIGS. 1–4, the material spreader MS of the present invention includes a hopper 10 which is open at top 12 and includes a closed bottom 14. The hopper 10 includes front wall 16 and rear wall 18. The hopper 10 further includes left and right side walls 20 and 22. As best shown in FIGS. 2 and 4, the front and rear walls 16 and 18, are tapered downwardly and inwardly thereby forming a V-shaped configuration. The left and right side walls 20 and 22 are likewise downwardly and inwardly tapered.

As best shown in FIG. 4, the front wall 16 is substantially planar throughout its length, and each of the left and right side walls 20 and 22 and rear wall 18, include a downwardly and inwardly inclined or tapered section which is joined at the top by a substantially vertical section. In particular, the left side wall 20 includes a lower tapered section 24 and an upper substantially vertical section 26. Likewise, the right side wall 22 includes a lower inwardly tapered section 28 and an upper substantially vertical section 30. In the same manner, the rear wall 18 also includes a lower inwardly tapered section 32 and an upper substantially vertical section 34. This configuration facilitates properly holding of the material in the hopper 10 and allows it to flow freely in an efficient manner during the spreading operation.

As best shown in FIG. 3, a conventional attachment mechanism 36 is provided on the rear wall 18 of hopper 10 for mounting the material spreader MS transversely to the hydraulic mechanism 36 of a tractor T (FIG. 1).

As best shown in FIG. 4, a screw-auger 40 is provided on the bottom 14 of hopper 10 and is rotatably mounted thereto in a conventional manner. The auger 40 includes a continuous blade 42 helically mounted on axle 44 (FIG. 5). The auger 40 is rotated by a motor 46 mounted on the right wall 22 (FIGS. 2–3), in a conventional manner.

As best shown in FIG. 5, hopper 10 includes left and right material discharge openings 48 and 50, respectively. Adjacent the left discharge opening 48, preferably four radially extending blades 52 are equidistantly mounted on left end 54 of auger 40. Preferably, two more blades 56 are generally oppositely positioned on the left end 54 of auger 40 and are positioned inwardly of blades 52. Although both sets of blades 52 and 56 function to kick or spin-out the material from inside the hopper towards left discharge opening 48, the blades 56 function more to keep the material loose and from clumping-up during the discharge operation. In the same manner, blades 52, which are adjacent left side wall 20, keep the material from accumulating against the wall 20 and thus free-flowing.

The right end 58 of auger 40 is also provided with two sets of blades. In particular, preferably four blades 60 extend radially outwardly from axle 44. (This set of blades is adjacent right side wall 22 and functions in the same manner as the left side blades 52.) Preferably, two generally oppositely positioned blades 62 are mounted in the same manner as left blades 56. (It is noted herewith that it is well within the scope of this invention to vary the number of blades in each set and to change their orientation relative to auger 40, and their respective dimensions and sizes, if necessary.)

Figure 6:
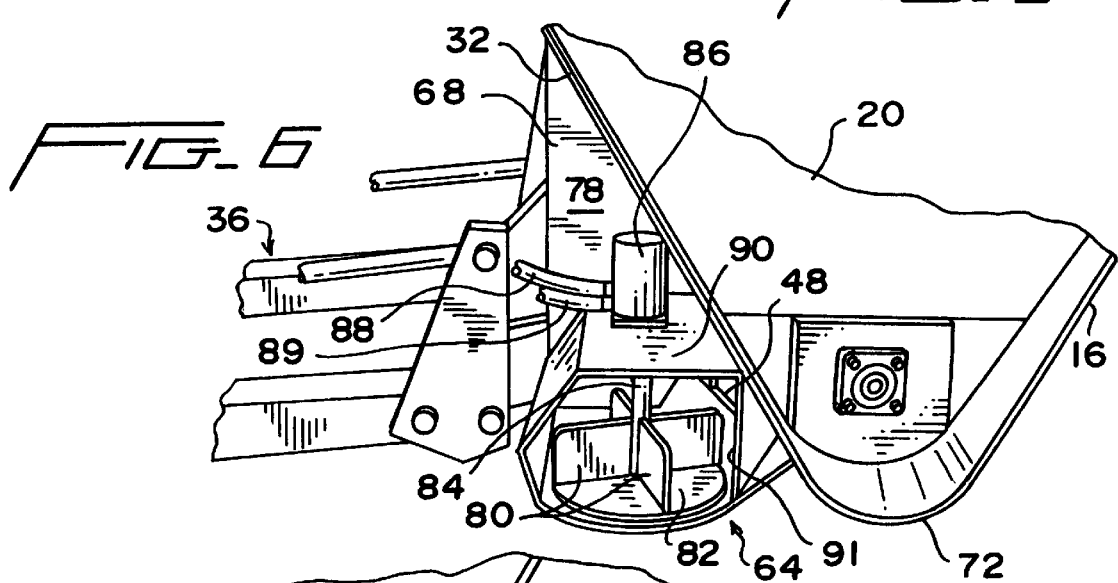
FIG. 6 is a partial left side elevational view of the spreader device showing the spinner.

As best shown in FIGS. 5–6, left and right spinner mechanisms 64 and 66, respectively, are provided on the exterior adjacent the respective openings 48 and 50. The spinner mechanisms 64 and 66 are provided in left and right recesses 68 and 70, respectively, on the exterior of rear wall 18 (FIGS. 2,3 and 6).

As best shown in FIGS. 3, 4 and 6, front and rear walls 16 and 18 extend past left and right side walls 20 and 22, and form generally V-shaped left and right yoke sections 72 and 74, respectively. As can be readily appreciated, the right yoke section 74 securely holds motor 46 and prevents its damage during maneuvering of the spreader device MS in a stall or the like.

As best shown in FIG. 3, right recess 70 is defined by component 76 of tractor attachment mechanism 36 and lower tapered section 32 of rear wall 18. Likewise, left recess 68 is defined by component 78 and the lower tapered section 32 of rear wall 18 (FIG. 6).

The left spinner mechanism 64 includes preferably four radially extending blades 80 mounted on a generally circular support plate 82. An output shaft 84 extends outwardly from motor 86 and is connected to support plate 82 and blades 80. Hydraulic lines 88 and 89 connect the motor 86 with the tractor hydraulic mechanism for actuating the spinner mechanism 64. As shown in FIG. 6, a shroud or housing 90 encloses the spinner mechanism 64 and includes a side opening 91 for shooting or spreading out the material.

Figure 7:
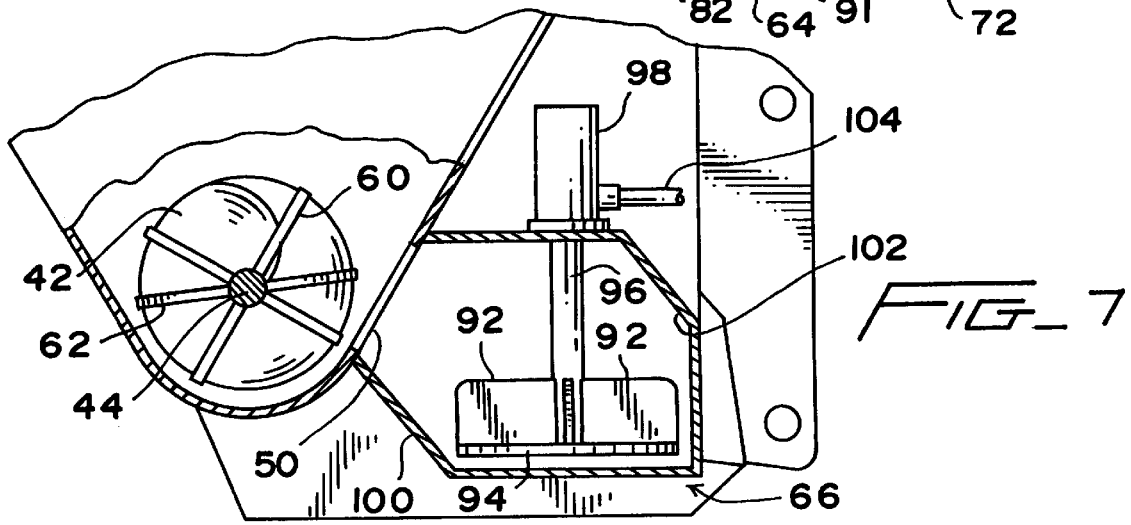
FIG. 7 is an enlarged, partial, right side elevational view, partially broken, showing the auger and the spinner.

FIG. 7 illustrates the right spinner mechanism 66 which also includes preferably four radially extending blades 92 mounted on a generally circular support plate 94. An output shaft 96 extends from motor 98 and is connected to the blades 92 and plate 94, for rotating the blades. A housing 100 encloses the spinner mechanism 66 and includes a side opening 102 for shooting-out the material.

Figure 8:
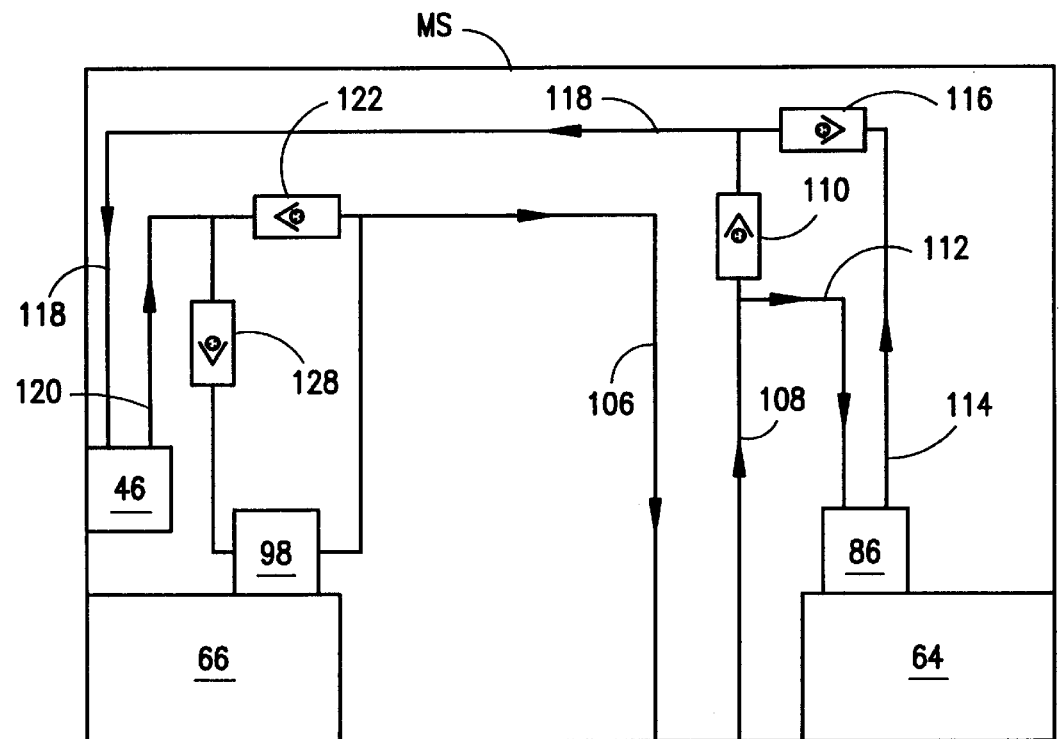
FIG. 8 is a schematic illustration of the hydraulic mechanism for running the left spinner and the auger.

FIG. 8 illustrates the hydraulic mechanism for selectively running the left spinner mechanism 64. As illustrated, two hydraulic lines 106 and 108 run between the tractor hydraulic mechanism 38 and the material spreader MS. When it is desired to run the left spinner mechanism 64, the hydraulic fluid from the tractor hydraulic mechanism flows in hydraulic line 108. As one of ordinary skill in the art would appreciate that due to the direction of check valve 110, the fluid would flow into left motor 86 via line 112. The fluid from motor 86 will outflow via line 114, through check valve 116 and line 118 to then turn on auger motor 46. The fluid from auger motor 46 will then outflow via line 120, through check valve 122 to line 106, and back to the tractor hydraulic mechanism. One of ordinary skill in the art would appreciate that the left spinner motor 86 is actuated by flowing the hydraulic fluid into the material spreader MS via line 108. In this manner, only the left motor 86 is actuated and, due to the presence and direction of check valve 110, any fluid flow to the right spinner motor 98 is bypassed and the right spinner mechanism 66 is therefore not actuated.

Figure 9:
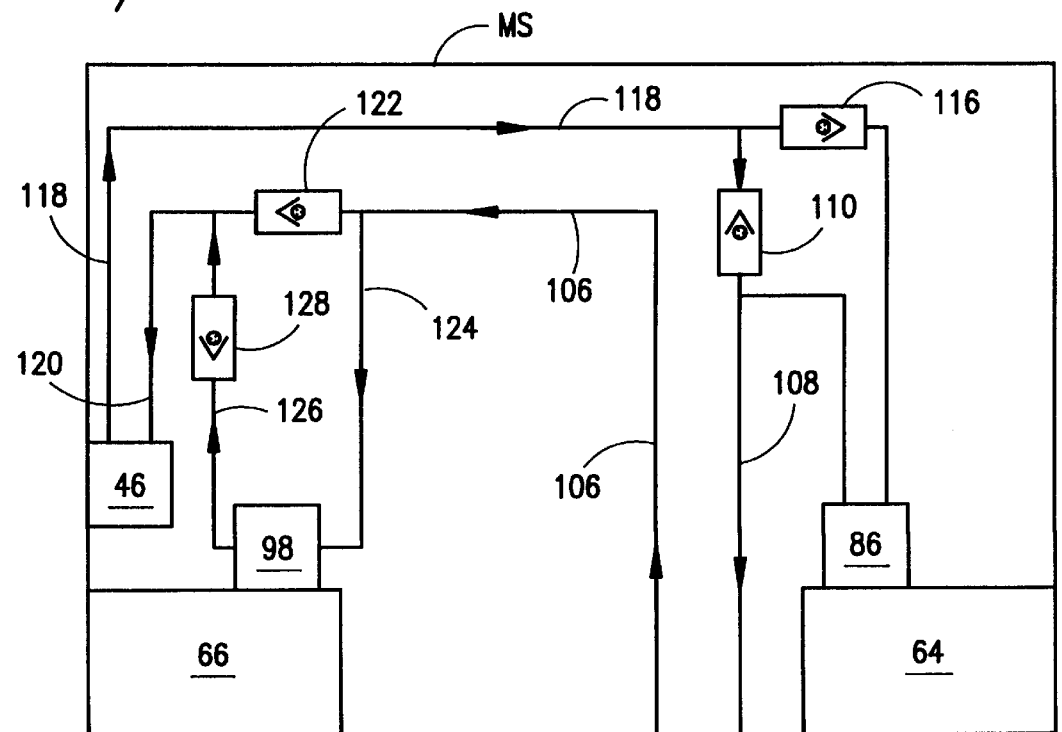
FIG. 9 is a schematic illustration of the hydraulic mechanism for running the right spinner and the auger.

As illustrated in FIG. 9, when it is desired to run the right spinner mechanism 66, the flow of fluid from the tractor hydraulic mechanism is reversed such that the fluid now flows from line 106 to right motor 98 via line 124. Due to the presence of check valve 122, the fluid actuates right motor 98 and flows out therefrom via line 126, through check valve 128, and into auger motor 46 via line 120. From the auger motor 46, the fluid flows back to the tractor hydraulic mechanism of the tractor via line 118 to check valve 110, and from there via line 108 back to the tractor. In this manner, any fluid flow to the left motor is completely bypassed due to the presence of check valve 116.

While this invention has been described as having a preferred design, it is understood that it is capable of further modifications, uses and/or adaptations following in general the principle of the invention, and including such departures from the present disclosure as those come within the known or customary practice in the art to which the invention pertains, and as may be applied to the central features hereinsetforth, and fall within the scope of the invention and the limits of the appended claims.

What is claimed is:

1. A bedding material spreader device for selectively discharging a material from one of the sides thereof, comprising:
   a) hopper means for holding a material;
   b) said hopper means being open at top and including a closed bottom;
   c) said hopper means including front, rear, left and right sides;
   d) auger means rotatably positioned along the bottom of said hopper means;
   e) first material discharge means disposed about one of said left and right sides of said hopper means and second material discharge means disposed about the other of said left and right sides of said hopper means;
   f) said first material discharge means including first spinner means and said second material discharge means including second spinner means;
   g) said hopper means including first and second enclosure means extending between the left and right sides for accommodating said first and second spinner means, respectively;
   h) said first and second enclosure means each comprising a shroud positioned in an external recess adjacent the rear side of said hopper means;
   i) said shroud including means for forming a channel for discharging a material;
   j) means for allowing scooping-up of a material operably connected to said hopper means; and
   k) means for selectively rotating one of said first and second spinner means for thereby discharging a material from one of said left and right sides of said hopper means.

2. The bedding material spreader device of claim 1, wherein:
   a) said first and second material discharge means each includes an opening adjacent said first and second spinner means, respectively.

3. The bedding material spreader device of claim 2, further comprising:
   a) material kicking means coaxially mounted on said auger means adjacent said opening.

4. The bedding material spreader device of claim 3, wherein:
   a) said material kicking means comprises a first set of radially extending blades.

5. The bedding material spreader device of claim 4, wherein:
   a) said material kicking means comprises a second set of radially extending blades.

6. The bedding material spreader device of claim 5, wherein:
   a) said second set of blades is mounted inwardly of said first set of blades.

7. The bedding material spreader device of claim 5, further comprising:
   a) material loosening means; and
   b) said second set of blades comprises said material loosening means.

8. The bedding material spreader device of claim 7, wherein:
   a) said second set of blades comprises first and second blades generally oppositely mounted on said auger means.

9. The bedding material spreader device of claim 1, wherein:
   a) said selective first and second spinner rotating means comprises a reversible hydraulic mechanism.

10. A bedding material spreader device for selectively discharging a material from one of the sides thereof, comprising:
    a) a hopper for holding a material;
    b) said hopper being open at top and including a closed bottom;
    c) said hopper including front, rear, left and right sides;
    d) an auger rotatably positioned along the bottom of said hopper for conveying the material;
    e) first and second material discharge openings provided adjacent the rear side of said hopper and adjacent the bottom thereof;
    f) a plurality of radially extending material kicking blades mounted on said auger adjacent each of said first and second material discharge openings;
    g) first and second spinners for spreading the material positioned on the exterior of said hopper adjacent said first and second discharge openings, respectively;
    h) said first spinner being positioned in a first shroud extending between the left and right sides of said hopper;
    i) said second spinner being positioned in a second shroud extending between the left and right sides of said hopper;
    j) each of said first and second shrouds being positioned in a corresponding external recess adjacent the rear side of said hopper;
    k) each of said first and second shrouds including means for forming a channel for discharging a material;
    l) means for allowing scooping-up of a material operably connected to said hopper; and
    m) means for selectively rotating one of said first and second spinners for thereby discharging a material from one of said left and right sides of said hopper.

11. The bedding material spreader device of claim 10, wherein:
    a) said first and second material discharge openings are provided on the left and right sides of said hopper.

12. The bedding material spreader device of claim 10, further comprising:
    a) means for selectively rotating one of said first and second spinners comprising a reversible hydraulic mechanism.

* * * * *